United States Patent
Cox

(10) Patent No.: US 12,453,301 B2
(45) Date of Patent: Oct. 28, 2025

(54) METHOD AND DEVICE FOR PLACING SEEDS IN CAPSULES

(71) Applicant: Klondike Agricultural Products LLC, Akron, OH (US)

(72) Inventor: Daniel S. Cox, Summit, NC (US)

(73) Assignee: Klondike Agricultural Products LLC, Akron, OH (US)

( * ) Notice: Subject to any disclaimer, the term of this patent is extended or adjusted under 35 U.S.C. 154(b) by 462 days.

(21) Appl. No.: 17/968,753

(22) Filed: Oct. 18, 2022

(65) Prior Publication Data

US 2024/0122091 A1    Apr. 18, 2024

(51) Int. Cl.
| | | |
|---|---|---|
| *B65B 35/18* | (2006.01) | |
| *A01C 1/04* | (2006.01) | |
| *B65B 5/10* | (2006.01) | |
| *B65B 57/10* | (2006.01) | |

(52) U.S. Cl.
CPC ............... *A01C 1/04* (2013.01); *B65B 5/105* (2013.01); *B65B 35/18* (2013.01); *B65B 57/10* (2013.01); *A01C 2001/048* (2013.01)

(58) Field of Classification Search
CPC ............ B65B 1/06; B65B 1/30; B65B 5/105; B65B 35/18; B65B 7/2807; B65B 7/2821; B65B 43/50; B65B 43/60; B65B 57/10; B65B 2220/14; A01C 1/04; A01C 7/042; A01C 2001/048; A01G 9/085
USPC .......... 53/53, 494, 240, 281; 47/1.01 P, 57.6
See application file for complete search history.

(56) References Cited

U.S. PATENT DOCUMENTS

| | | | |
|---|---|---|---|
| 755,865 A | | 3/1904 | Fraser et al. |
| 2,630,953 A | * | 3/1953 | Kath .................. A61J 3/074 |
| | | | 141/237 |
| 3,078,629 A | | 2/1963 | Besemer et al. |
| 3,187,463 A | | 6/1965 | Mccollough |
| 3,331,155 A | | 7/1967 | Chancellor |
| 3,844,987 A | | 10/1974 | Clendinning et al. |
| 3,847,641 A | | 11/1974 | Cushman et al. |
| 3,960,292 A | * | 6/1976 | Knapp ................. A01C 1/06 |
| | | | 47/57.6 |
| 3,973,355 A | | 8/1976 | McKenzie |

(Continued)

FOREIGN PATENT DOCUMENTS

| | | |
|---|---|---|
| EP | 0607140 | 7/1994 |
| JP | 2758430 B2 * | 5/1998 |

(Continued)

OTHER PUBLICATIONS

Taina, Matos, "PCT Search Report", PCT/US2023/035417; Filed Oct. 17, 2023; Mailed Feb. 9, 2024.

(Continued)

*Primary Examiner* — Stephen F. Gerrity
(74) *Attorney, Agent, or Firm* — Philip H. Burrus, IV

(57) ABSTRACT

A device and method for inserting seeds in a capsule includes a seed bin for storing a plurality of plant seeds and a materials bin for storing a growing medium, enables a first tray and a second tray to move to a plurality of positions. At vacuum needle generates a vacuum suction at a tip sufficient to extract a plant seed from a bin. A robot arm, moves the vacuum needle to a plurality of positions. Circuitry controls the motor. When the vacuum suction from the vacuum needle is removed, the seed picked up by the vacuum needle is released into a capsule body.

20 Claims, 4 Drawing Sheets

(56) References Cited

U.S. PATENT DOCUMENTS

| | | | |
|---|---|---|---|
| 4,008,544 A | 2/1977 | Rupprecht et al. | |
| 4,016,678 A | 4/1977 | Larsen et al. | |
| 4,145,206 A | 3/1979 | Ford | |
| 4,186,670 A | 2/1980 | Hagner | |
| 4,192,095 A | 3/1980 | Haslam | |
| 4,192,096 A | 3/1980 | Platt et al. | |
| 4,221,175 A * | 9/1980 | Van Wingerden | A01G 9/085 141/141 |
| 4,251,011 A * | 2/1981 | Hamilton et al. | A01C 7/042 47/74 |
| 4,411,205 A * | 10/1983 | Rogers | A01G 9/085 111/915 |
| 4,628,633 A | 12/1986 | Nilsson | |
| 4,669,217 A | 6/1987 | Fraze | |
| 4,706,411 A | 11/1987 | Lovqvist | |
| 4,761,423 A | 8/1988 | Szego | |
| 4,769,945 A | 9/1988 | Motoyama et al. | |
| 4,777,762 A | 10/1988 | Rodenbaugh et al. | |
| 4,779,376 A | 10/1988 | Redenbaugh | |
| 4,808,430 A | 2/1989 | Kouno | |
| 5,010,685 A | 4/1991 | Sakamoto et al. | |
| 5,106,648 A | 4/1992 | Williams | |
| 5,129,180 A | 7/1992 | Stewart | |
| 5,236,439 A | 8/1993 | Carlson et al. | |
| 5,250,082 A | 10/1993 | Teng et al. | |
| 5,300,127 A | 4/1994 | Williams | |
| 5,334,229 A | 8/1994 | Sakamoto | |
| 5,347,753 A | 9/1994 | Dall | |
| 5,427,593 A | 6/1995 | Carlson et al. | |
| 5,429,654 A | 7/1995 | Swarup | |
| 5,451,241 A | 9/1995 | Carlson et al. | |
| 5,486,218 A | 1/1996 | Carlson et al. | |
| 5,564,224 A | 10/1996 | Carlson et al. | |
| 5,572,827 A | 11/1996 | Conrad | |
| 5,595,748 A | 1/1997 | Hewlett et al. | |
| 5,666,762 A | 9/1997 | Carlson et al. | |
| 5,687,504 A | 11/1997 | Carlson et al. | |
| 5,701,699 A | 12/1997 | Carlson et al. | |
| 5,732,505 A | 3/1998 | Carlson et al. | |
| 5,787,640 A | 8/1998 | Duke | |
| 5,794,550 A | 8/1998 | Chadwick | |
| 5,930,949 A | 8/1999 | Tsujimoto et al. | |
| 6,112,457 A | 9/2000 | Kohno et al. | |
| 6,119,395 A | 9/2000 | Hartle et al. | |
| 6,164,012 A | 12/2000 | Lechelt-Kunze et al. | |
| 6,311,426 B1 | 11/2001 | Mehta et al. | |
| 6,349,499 B1 | 2/2002 | Spittle | |
| 6,446,386 B1 | 9/2002 | Holloway | |
| 6,516,565 B1 | 2/2003 | Fima | |
| 6,557,298 B2 | 5/2003 | Obert et al. | |
| 6,572,809 B1 | 6/2003 | Nishiyama et al. | |
| 6,887,431 B1 * | 5/2005 | Vann et al. | B01L 3/021 436/178 |
| 7,131,234 B2 | 11/2006 | Carlson et al. | |
| 7,168,205 B2 | 1/2007 | Hartle et al. | |
| 7,228,658 B2 | 6/2007 | Hirahara et al. | |
| 7,356,965 B2 | 4/2008 | Carlson et al. | |
| 7,490,436 B2 | 2/2009 | Kohno et al. | |
| 7,547,488 B2 | 6/2009 | Dimakis et al. | |
| 7,568,309 B2 | 8/2009 | Hirahara | |
| 7,591,297 B2 | 9/2009 | Lee | |
| 7,603,807 B2 * | 10/2009 | McKinnis et al. | A01C 11/00 294/186 |
| 7,654,037 B2 | 2/2010 | Hartle | |
| 8,141,293 B2 | 3/2012 | Ronneke | |
| 8,683,742 B1 | 4/2014 | Cox | |
| 10,524,427 B2 * | 1/2020 | Cox | A01C 1/04 |
| 2003/0101643 A1 | 6/2003 | Hartle et al. | |
| 2003/0106258 A1 * | 6/2003 | Keller et al. | A01G 9/085 47/1.01 P |
| 2003/0187181 A1 | 10/2003 | Sakane et al. | |
| 2005/0102895 A1 | 5/2005 | Bissonnette et al. | |
| 2006/0032121 A1 | 2/2006 | Hiragana | |
| 2008/0202026 A1 | 8/2008 | Bong Kyun | |
| 2010/0263274 A1 | 10/2010 | Corak et al. | |
| 2011/0083363 A1 | 4/2011 | Trias Vila et al. | |
| 2011/0202171 A1 * | 8/2011 | Rosenbaum | B65B 35/18 707/758 |
| 2013/0032514 A1 | 2/2013 | Deppermann | |
| 2013/0174483 A1 | 7/2013 | Caspar et al. | |
| 2013/0252316 A1 | 9/2013 | Tyler | |
| 2014/0087942 A1 | 3/2014 | Trias | |
| 2014/0208648 A1 | 7/2014 | Cox | |
| 2015/0135586 A1 | 5/2015 | Rubatino | |
| 2015/0355058 A1 * | 12/2015 | Deppermann et al. | A01C 1/00 47/57.6 |
| 2016/0286715 A1 | 10/2016 | Kraus | |
| 2019/0183066 A1 * | 6/2019 | Conrad et al. | A01G 9/085 |
| 2020/0154644 A1 | 5/2020 | Cox | |

FOREIGN PATENT DOCUMENTS

| | | | |
|---|---|---|---|
| JP | 2001340005 | 12/2001 | |
| JP | 2008253184 | 10/2008 | |
| WO | 97/36471 | 10/1997 | |
| WO | 98/33375 | 8/1998 | |
| WO | 02/21914 | 3/2002 | |
| WO | 03/045139 | 6/2003 | |
| WO | 2006/13463 | 12/2006 | |
| WO | WO-2021219150 A1 * | 11/2021 | A01G 9/085 |

OTHER PUBLICATIONS

"Appeal Brief", U.S. Appl. No. 16/692,787; Application filed Nov. 22, 2019; Brief Filed Aug. 15, 2023.

Heo, Joo Hyung , "PCT Search Report", PCT/US2015/022709; Filed Mar. 26, 2015; Mailed Jun. 30, 2015.

Parsely, David , "Examiners Answer to Appeal Brief", U.S. Appl. No. 16/692,787, filed Nov. 22, 2019; Mailed Sep. 12, 2023.

Parsley, David , "Final OA", U.S. Appl. No. 14/229,615, filed Mar. 28, 2014; Mailed Apr. 17, 2017.

Parsley, David , "NonFinal OA", U.S. Appl. No. 14/229,615, filed Mar. 28, 2014; Mailed Nov. 29, 2016.

Parsley, David , "NonFinal OA", U.S. Appl. No. 14/229,615, filed Mar. 28, 2014; Mailed Feb. 6, 2018.

Parsley, David, "NonFinal Office Action", U.S. Appl. No. 16/692,787, filed Nov. 22, 2019; Mailed Feb. 16, 2022.

Parsley, David J. , "NonFinal Office Action", U.S. Appl. No. 16/692,787, filed Nov. 22, 2019; Mailed Oct. 26, 2022.

Parsley, David J. , "Final Office Action", U.S. Appl. No. 16/692,787, filed Nov. 22, 2019; Mailed Jun. 7, 2022.

Sundstrom, F.J. (Chip) , "Expert Declaration Filed in Appeal Brief", U.S. Appl. No. 16/692,787; Application filed Nov. 22, 2019; Declaration Filed Aug. 15, 2023.

\* cited by examiner

METHOD AND DEVICE FOR PLACING SEEDS IN CAPSULES

BACKGROUND

Field

This disclosure relates to automated machinery and to a device and method for automatically inserting a seed in a capsule.

Description of the Related Art

As explained in U.S. Pat. No. 10,524,427 (assigned to Klondike Agricultural Products, the same assignee of the present application), a biodegradable container, such as a capsule, can be filled with a plant seed and other materials, such as soil and fertilizer, to help a plant seed grow. This configuration can result in better, more efficient, and more environmentally safe plant growth than conventional plant growth in which seeds, soil, and fertilizer are spread relatively indiscriminately across a field. This conventional process uses significant amount of fertilizer, which can result in runoff that damages the environment.

Manufacturing a capsule with the plant seed and growth materials inside is labor intensive and inefficient. It would therefore be desirable to have a machine or device that can manufacture such a capsule automatically.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
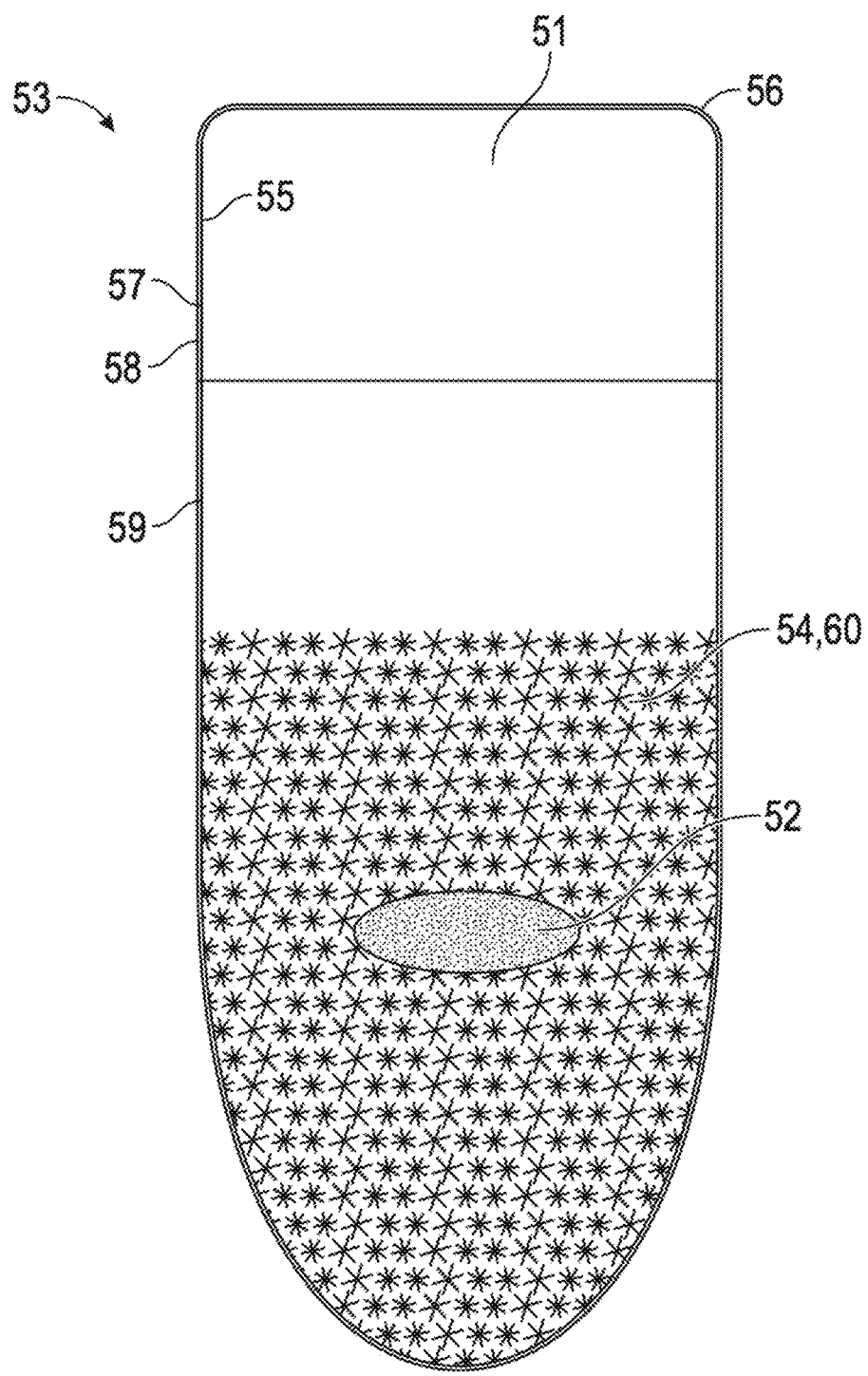
FIG. 1 shows a container according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in simplified form in order to avoid obscuring the concepts of the subject technology.

In the drawings referenced herein, like reference numerals designate identical or corresponding parts throughout the several views or embodiments.

This application incorporates by reference the entire contents of U.S. Pat. No. 10,524,427, which is assigned to the same entity, Klondike Agricultural Products, as the present application. As explained in U.S. Pat. No. 10,524,427 and shown in FIG. 1 of this application, a container 56 can define a boundary between an interior region 51 interior to container 56, and the exterior 53 of container 56. Interior region 56 has a volume or capacity to receive contents that can be placed inside the container Those materials can include, for example, a medium 54, additive(s) 60, and a plant source 52, such as a plant seed. Container 56 can include an interior surface 55 and an exterior surface 57 and be divided into separate portions, such as cap 58 and body 59.

When container 56 is closed, container 56 can form a closed shape that separates interior region 51 from exterior 53 by a physical (at least partly solid) boundary that completely surrounds interior region 51. The configuration (e.g., shape, size) of container 56 can vary from that illustrated in FIG. 1. Container 56 can be a capsule such as a pharmaceutical capsule (either for human beings or for animals) or another kind of container and can be of a size and/or shape identical, similar to, or different from the size/shape of a pharmaceutical capsule. Cap 58 and body 59 are preferably configured to be joined together after filling container 56 with contents. Cap 58 and body 59 can be joined, for example, by applying a force between them, by configuring them to overlap each other in a sealable manner when joined, by applying a material to maintain the joining, or any other manner capable of keeping cap 58 joined to body 59 as may be known by one skilled in the art.

Medium 54 can be, for example, a growing medium to assist growth of plant source 52, such as a plant seed. Medium 54 and plant source 52 can provided in interior region of container 56. Medium 54 include one or more additives 60. Medium 54 can be an organic material such as a natural soil or peat. Medium 54 can also include inorganic or organic fillers such as conventionally used in seed starting pots. Medium 54 can also include materials to control the moisture content within interior region 51.

Medium 54 can include a protein to facilitate plant germination. Organic protein enzymes such as those in fish oils, peanut oils, and bark composts have been found to be specifically suitable for this purpose. Additive 60 can include conventional fertilizers such as to provide additional potassium, potash, phosphate, nitrogen or other mineral(s) suited to the specific type of seed or soil condition. In addition, additive 60 can include conventional pesticides (which term is intended to include fungicides) depending on the needs of the particular growing conditions. Additive 60 can also be microencapsulated or otherwise treated to provide a time release of additive 60 over a predetermined period, such as the early germination of a plant seed.

Medium 54 can comprise a growing medium, a binder, or both. For example, medium 54 can comprise two separate substances, one a growing medium and one a binder or comprise a single substance having both a growing medium and a binder. Where medium 54 is a growing medium, growing medium 54 can be organic, inorganic, or partly organic and partly inorganic. Medium 54 can be soil, peat moss, or other materials as are known to assist in the growth of plant source 52, such as a plant seed.

Medium 54 can include a binder, such as a substance that is capable of holding or anchoring one or more other materials in it or to it. The binder can be capable of releasing the held or anchored material(s), e.g., under certain conditions, at a later time, or at a slower rate than the rate at which the material(s) was (were) absorbed. Release of the held or anchored material(s) may make the held or anchored material(s) available to plant source 52 (e.g., available for uptake by plant source 52), whereas prior to their release the held or anchored material(s) may be unavailable to plant source 52 and incapable of affecting the plant source. The rate, extent(s), and/or time(s) of release of the held or anchored material(s) can be controlled by causing certain conditions to be satisfied or preventing them from being satisfied, which can be accomplished, for example, by regulating, modifying, or manipulating the environment of the binder. The binder can be non-adherent, that is, not operable to adhere to materials adjacent to it (e.g., plant source 52) and can play a role in rendering the held or anchored material(s) incapable of affecting plant source 52 so long as the material(s) remain(s) held or anchored.

The binder can comprise any of the following: polyacrylamide, rice, a hydrogel (which may be acrylamide-based), a superabsorbent polymer, sodium bicarbonate (baking soda; NaHCO3), corn starch, or compost. Alternatively, the binder can comprise one or more other materials. In the case where binder is polyacrylamide, it can comprise pulverized or ground crystals of polyacrylamide. In the case where binder is rice, it can comprise pulverized or ground rice. Polyacrylamide is available commercially, for example, as Miracle-Gro® Water Storing Crystals. Some or all of the above-mentioned binder materials are hydrophilic and hence may be capable of retaining an enormous amount of water, for example, several hundred times their own weight in water. The retained water can be slowly released from the binder so that biner is operable to retain water and to limit the release of the retained water.

Additive(s) 60 can be bound to binder, such that binder anchors or holds additive(s) 60. Additive(s) 60 can include at least one of the following: a fertilizer, a pesticide, a hormone, a steroid, or a fungus capable of mycorrhizal association with a plant source or the plant that is to grow from the plant source. The term "pesticide" can be used in a broad sense to encompass substances and products that protect plants from damaging influences such as weeds, plant diseases, insects, or others. The term "pesticide" can include, for example, herbicides, insecticides, insect growth regulators, nematicides, insect repellents, animal repellents, fungicides, or antimicrobial agents. The preceding listings of specific additives 60 are not limiting and can comprise any of a wide range of biodegradable materials.

To control the time at which additives 60 are released to plant source 52 and the plant that grows therefrom, a wax can be applied to the binder such as to coat binder with the wax. The wax can prevent or hinder water from contacting the binder. This in turn delays the release of water and additive 60 from the binder, thus delaying application of additive 60 to plant source 52. Such delay can serve to delay germination, or to lengthen a crop cycle, for example, or can be useful for plants having a longer germination time or life cycle. Wax can also be applied to additive 60 such as to coat additive 60 with the wax, which may achieve a similar effect, delaying release of additive 60.

Figure 2:
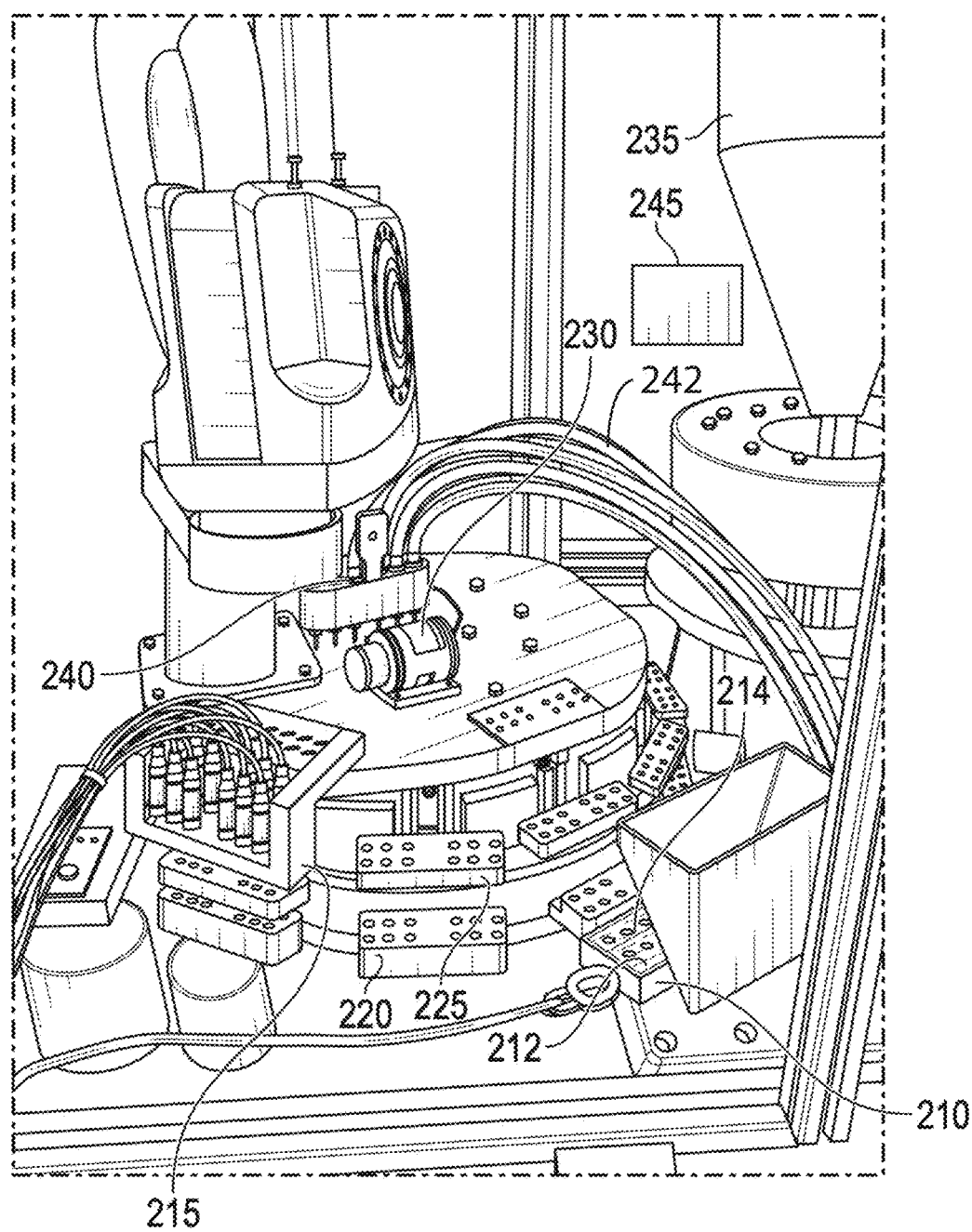
FIG. 2 shows an exemplary machine for manufacturing containers according to an embodiment.

FIG. 2 shows an exemplary device for inserting seeds into a container according to an embodiment. As shown in FIG. 2, a device 200 includes a seed bin 210, a materials bin 215, a first tray 220, a second tray 225, a motor 230, a robot arm 235, vacuum needles 240, and control circuitry 245. Device 200 is configured to prepare a container, such as a capsule, with a plant source, such as a plant seed, and materials, such as a growing medium, seal the container, confirm that the sealed container includes a seed, collect the sealed containers, and separate the sealed containers lacking a seed from the sealed containers containing seeds. For purposes of the following description, the container is described as being a capsule, but hit should be understood that it is applicable to other containers besides capsules.

Seed bin 210 can be configured to receive, store, and provide plant sources, such as plant seeds, to be placed in respective capsules. Seed bin 210 preferably includes at least a base portion and side walls to maintain the plant seeds within seed bin 210. Seed bin 210 can be formed from a variety of materials including, for example, stainless steel, ceramic, glass, or other material that provides a solid surface to hold the plant seeds and preferably provides a hygienic surface to the plant seeds.

Materials bin can be 215 can configured to receive, store, and provide materials, such as medium 54, binders, and/or additives 60, to be placed in the capsules. Although only one is shown, more than one materials bin 215 can be included in device 200 to provide different materials in each materials bin 215. Materials bin 215 preferably includes at least a base portion and side walls to maintain the materials within materials bin 215. Materials bin 215 can also include an output port or spout that enables distribution of materials within materials bin 215 into capsules. Materials bin 215 can be formed from a variety of materials including, for example, stainless steel, ceramic, glass, or other material that provides a solid surface to hold the materials and preferably provides a hygienic surface to the materials.

Figure 3:
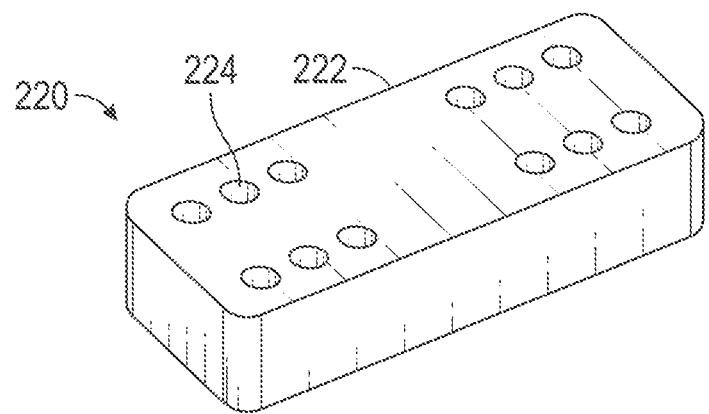
FIG. 3 shows an exemplary tray to use in the machine of FIG. 2 according to an embodiment.

First tray 220 can be configured to receive, hold, and expel portions of the container, such as a capsule body 59. First tray 220 preferably includes at least a base portion having a thickness and one or more cavities, spaces, or other openings configured to receive and hold a respective capsule body 59. FIG. 3 shows an example of a tray for holding portions of a container. As shown in FIG. 3, first tray 220 can include a base portion 222 and a plurality of openings 224. Openings 224 can be complete from a top surface to a bottom surface of base portion 222 or only partway from a top surface to within the body of base portion 222. Each opening 224 is preferably shaped to be complementary to the shape of capsule body 59 sufficient to hold in a snug or somewhat snug manner to minimize movement of the capsule body 59 when positioned within an opening 224. First tray 220 can be formed from a variety of materials including, for example, stainless steel, ceramic, or other material that provides a solid material to hold the capsule body 59 and preferably applies a hygienic surface to the capsule body 59.

Figure 4:
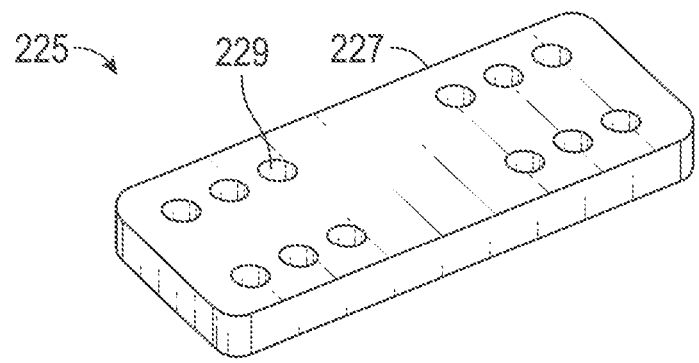
FIG. 4 shows another exemplary tray to use in the machine of FIG. 2 according to an embodiment.

Second tray 225 can be configured to receive, hold, and expel portions of the container, such as a capsule cap 58. Second tray 225 preferably includes at least a base portion having a thickness and one or more cavities, spaces, or other openings configured to receive and hold a respective capsule cap 58. FIG. 4 shows an example of a tray for holding other portions of a container. As shown in FIG. 4, Second tray 225 can include a base portion 227 and a plurality of openings 229. Openings 229 can be complete from a top surface to a bottom surface of base portion 227 or only partway from a top surface to within the body of base portion 227. Each opening 229 is preferably shaped to be complementary to the shape of capsule cap 58 sufficient to hold in a snug or somewhat snug manner to minimize movement of the capsule cap 58 when positioned within an opening 229. Second tray 225 can be formed from a variety of materials including, for example, stainless steel, ceramic, or other material that provides a solid material to hold the capsule cap 58 and preferably applies a hygienic surface to the capsule cap 58.

Motor 230 is preferably configured to be coupled to first tray 220 and second tray 225 to move each one to different positions within device 200. Although only one first tray 220 and one second tray 225 is shown, more than one of each can be included in device 200. The coupling is preferably configured to enable first and second trays 220, 225 to be attached to and removed from motor 230. Motor 230 can be, for example, electric motor that produces sufficient power for providing motive force to move first and second trays 220, 225 to different positions within device 200. Motor 230 can include a substantially circular portion that couples to first and second trays 220, 225 and is rotatable in response to a force provided by motor 230. The circular portion can include two separate circular portions that are respectively coupled to first and second trays 220, 225 so that first and second trays 220, 225 can be moved independently of each other. Motor 230 can be controlled to move first and second trays 220, 225 to different positions within device 200 as explained herein.

Robot arm 235 is preferably configured to be coupled to vacuum needles 240 to move vacuum needles 240 to different positions within device 200 and can also be configured to provide control signals to vacuum needles 240 to control operations and functions of vacuum needles 240. Robot arm 235 can be coupled at an end portion of robot arm 235 to vacuum needles 240. In operation, robot arm 235 can be configured to receive and/or provide control signals that move robot arm 235 in a manner that can position vacuum needles 240 at locations within device 200 including a position adjacent to seed bin 210 that enables vacuum needles to pick up plant seeds from seed bin 210 and a position adjacent to first tray 220 that enables vacuum needles to drop picked up plant seeds into respective capsule bodies 59 held within first tray 220. The coupling is preferably configured to enable vacuum needles 240 to be attached to and removed from robot arm 235. Robot arm 235 can be directly coupled to a power source, such as an electrical outlet, to power the movement of robot arm 235.

Vacuum needles 240 are configured to provide a vacuum suction at end tip top of a nozzle of each one. The vacuum suction enables each vacuum needle 240 to pick up a plant seed from seed bin 210 when the end tip of the nozzle of a vacuum needle 240 is positioned by robot arm 235 in the vicinity of a seed in seed bin 210. As long as vacuum suction remains in effect, any seed picked up by a vacuum needle 240 can be maintained at its end tip.

To further assist in ensuring that a single seed is picked up by vacuum needle 240, seed bin 210 can include a seed bin cover 212. Seed bin cover 212 can be configured to have one or more holes 214, with the number of holes 214 preferably corresponding to the number of vacuum needles 240. In this manner, robot arm 235 can be configured to control vacuum needles 240 to be positioned to be above a respective hole 214, to be inserted through the respective hole 214 to pick up a seed from seed bin 210, and to be pulled up through the respective hole 214 with the picked-up seed. Holes 214 are also preferably configured to be sized not only to enable insertion of a respective vacuum needle 240, but also according to the size of a single seed. With such sizing, when vacuum needles 240 are pulled up through holes 214, any excess seeds that may have been picked up by vacuum needles 240 can be knocked off of the needle by the edge of the holes 214.

In addition, each nozzle of each vacuum needle 240 can be sized according to seed size with a larger nozzle size for larger seeds and a smaller nozzle size for smaller seeds. To enhance the suction of each vacuum needle 240, a tubing 242 can be added to each vacuum needle. Tubing 242 can be inserted over the nozzle of each vacuum needle 240 and preferably extend past the end of each nozzle. Tubing 242 can be a plastic, elastomer, or other material that preferably has flexibility and is non-porous. The circumference of tubing 242 is preferably configured in accordance with the size of the nozzle of the vacuum needle 240 and the size of the seed to be picked up. With the tubing 242 attached to the nozzle of vacuum needle 240, the vacuum needle 240 can provide an improved suction force that improves the ability of the vacuum needle 240 to maintain possession of a picked-up seed.

Control circuitry 245 can include circuitry, such as a microprocessor, microcontroller, CPU, memory, RAM, and/or ROM, that can be configured to control all of the operations of device 200 including, for example, control of movement of motor 230 and robot arm 235, positioning of first and second trays 220, 225, operation and positioning of vacuum needles 240, joining of capsule cap 58 to capsule body 59, provision of materials from materials bin 215 into capsule bodies 59 held in first tray 220, receive sensor data (described herein). In addition to this operational functionality, control circuitry 245 preferably includes transmitters and receivers that can transmit and receive data and signals over a variety of transmission paths including cellular, Wi-Fi, Bluetooth, NFC via IoT or any other form of wired or wireless transmission. Control circuitry 245 can also include one or more cameras, a keyboard, biometric reader, microphone, speaker, RFID, and/or GPS circuitry. Control circuitry 245 can be configured to store data and instructions in local memory, a hard drive, optical drive, distributed memory, or cloud storage.

Figure 5:
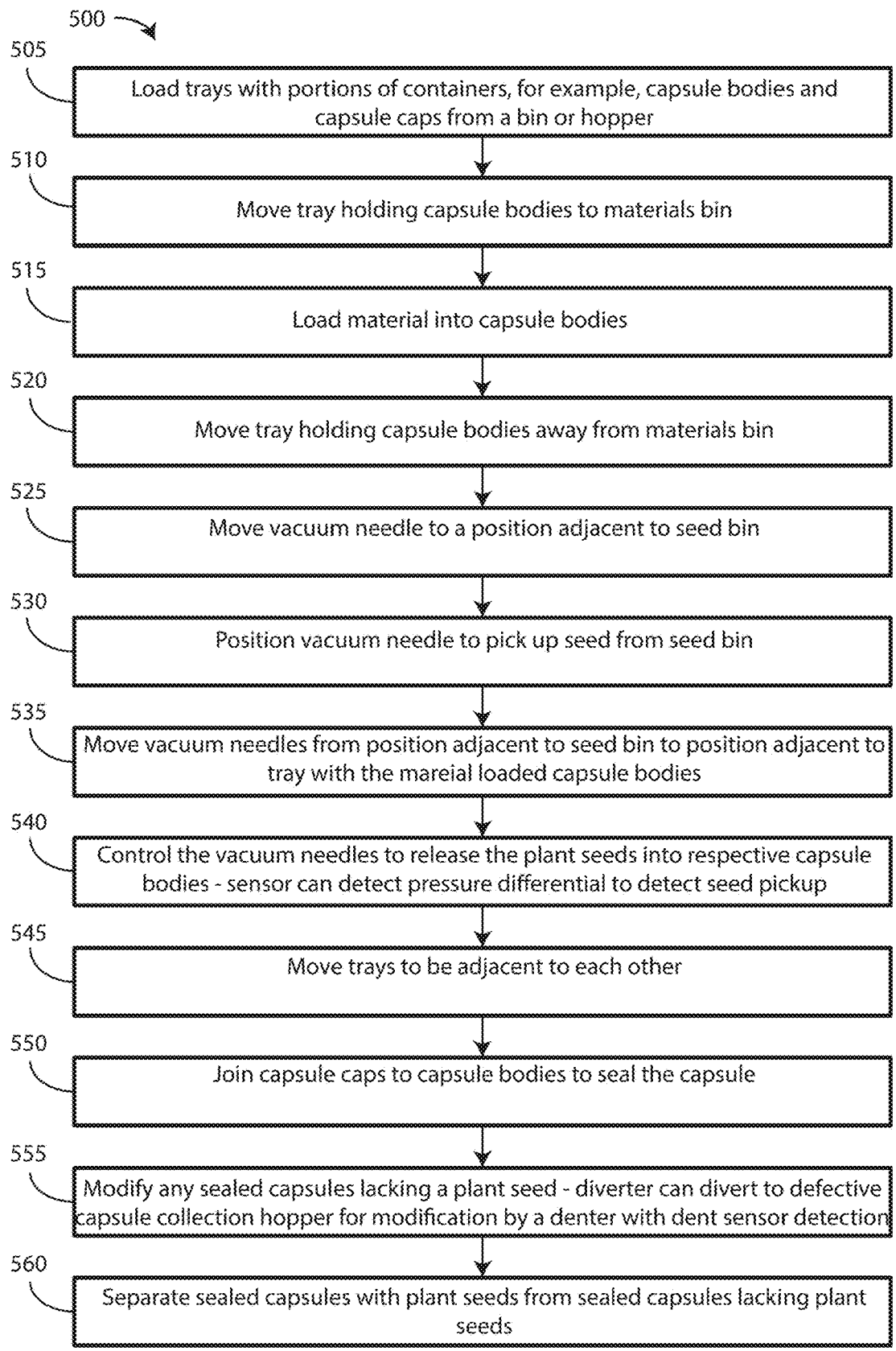
FIG. 5 is a flow chart for manufacturing containers according to an embodiment.

FIG. 5 is a flow diagram of a method 500 for inputting materials and a plant seed into a capsule according to an embodiment. As shown in FIG. 5, trays are loaded with portions of containers (step 505). For example, first tray 220 can be loaded with capsule bodies 59, and second tray 225 can be loaded with capsule caps 58. Capsule bodies 59 and capsule caps 58 are preferably loaded through an automatic mechanism, such as is known for pharmaceutical capsule machines, that places each capsule body 59 and each capsule cap 58 in a respective opening of first and second trays 220, 225 and in the proper orientation of each (e.g., with the capsule body opening facing up to receive materials from materials bin 215 and a plant seed from seed bin 210). Device 200 can include a bin or hopper for each of capsule bodies 59 and capsule caps 58 that include an output port or feeder configured to release capsule bodies 59 and capsule caps 58 into the openings of first and second trays 220, 225 in the proper orientation. Control circuitry 245 can provide applicable control signals that instruct the device 200 to load first and second trays 220, 225 with the respective capsule bodies 59 and capsule caps 58.

After trays have been loaded with respective container portions, the tray holding capsule bodies is moved to the materials bin (step 510). For example, first tray 220 holding capsule bodies 59 is moved by motor 230 to a position adjacent to materials bin 215. First tray 220 can be coupled to a circular portion of motor 230 that rotates from the position in which first tray 220 is loaded with capsule bodies 59 to a position adjacent to materials bin 215. Control circuitry 245 can provide applicable control signals to motor 230 to move first and second trays 220, 225 adjacent to materials bin 215.

Once positioned by the materials bin, material is loaded into the capsule portions in the tray (step 515). For example, with first tray 220 positioned adjacent to materials bin 215, an output port or feeder, or plurality thereof, provides materials (e.g., medium 54, binder, additive 60, or combination thereof) from materials bin into capsule bodies 59 in first tray 220. The materials bin 215 preferably includes controls that limit the amount of materials loaded into each capsule body 59 so that it does not overflow. The amount loaded can be a predetermined amount set according to the volume of the capsule body 59. Control circuitry 245 can provide applicable control signals to materials bin 215 to control that loading of materials from materials bin 215 into respective capsule bodies 59.

The tray with material-loaded capsule portions is then moved from the materials bin (step 520). The tray 220 can be moved, for example, to a position adjacent to seed bin 210. In addition, the vacuum needles are moved to a position adjacent to the seed bin (step 525). For example, robot arm 235 can be controlled to move the vacuum needles 240 to a position above seed bin 210 with the end tips of the vacuum needles located close to a top surface of the plant seeds present in the seed bin 210. Control circuitry 245 can provide applicable control signals that instruct the motor 230 to move tray 220 to the new position and to instruct robot arm 235 to move vacuum needles 240 to a position adjacent to seed bin 210.

Once in position, each vacuum needle picks up an individual plant seed from the seed bin (step 530). For example, the vacuum suction present at the end tip of each vacuum needle 240 is sufficient to pick up an individual plant seed from the surface of the plant seeds present in the seed bin 210. After it is detected that each vacuum needle has picked up a plant seed or after a predetermined time after being positioned adjacent to the seed bin, the vacuum needles are moved from adjacent to the seed bin to adjacent to the tray with the material-loaded capsule bodies (step 535). For example, after this detection or predetermined time, the robot arm 235 moves the vacuum needles 240 from adjacent to the seed bin 210 to adjacent to first tray 220. Control circuitry 245 can provide applicable control signals that instruct the robot arm 235 to move vacuum needles 240 from seed bin 210 to first tray 220.

Once positioned appropriately, the vacuum needles release the plant seeds into respective capsule bodies (step 540). For example, once the end tips of each vacuum needle 240 is positioned just above a respective capsule body 59 in first tray 220, the vacuum suction at each end tip is cutoff, which releases the plant seed into the respective capsule body 59. If there are more capsule bodies 59 in first tray 220 than vacuum needles 240, than the process of steps 525 to 540 can be repeated until each capsule body 59 has received a plant seed. Control circuitry 245 can provide applicable control signals that instruct the vacuum needles 240 to cutoff the vacuum suction once the end tips are positioned above respective capsule bodies.

In some circumstances, one or more vacuum needles 240 may fail to pick up a plant seed from seed bin 210. This failure can be detected in multiple ways. For example, a sensor can be included with vacuum needles 240 that detects the pressure differential at each vacuum needle 240. The pressure differential for vacuum needles 240 that have properly picked up a plant seed will be within a first range, whereas vacuum needles 240 that have failed to pick up a plant seed will be within a second range. The sensor can provide the pressure differential information to the control circuitry 245, which can determine which vacuum needles, if any have not picked up a seed based on the pressure differential information in comparison to the first and second ranges. Alternatively, the vacuum needles 240 can include a camera or proximity sensor that generate signals indicating the presence or absence of a plant seed at the end tip of each vacuum needle. These signals can also be provided to the control circuitry 245 to determine which vacuum needles 240, if any, failed to pick up a seed.

After each capsule body has received a seed, the trays are moved to be adjacent to each other (step 545). For example, circular portions of motor 230 can be rotated such that second tray 225 holding capsule caps 58 is positioned above first tray 220 holding capsule bodies 59. This positioning preferably aligns the openings of first and second trays 220, 225 so that the capsule caps 58 are positioned above respective capsule bodies. Control circuitry 245 can provide applicable control signals that instruct the motor 230 to move first and second trays 220, 225 to these positions.

The capsule caps and capsule bodies are joined to seal the capsule (step 550). For example, the openings of second tray 225 can be configured such that capsule caps 58 extend below a bottom surface of second tray 225, and openings of first tray 220 can be configured such that capsule bodies 59 extend above a top surface of first tray 220. Motor 230 can control first tray 220 and second tray 225 to move toward each other until capsule caps 58 join and merge with capsule bodies 59, thereby sealing each capsule with the materials from materials bin 215 and a plant seed from seed bin 210. Control circuitry 245 can provide applicable control signals that instruct the motor 230 to move first and second trays 220, 225 to join capsule caps 58 to capsule bodies 59.

After separating the trays, any sealed capsules lacking a plant seed can be modified (step 555). For example, after first and second trays 220, 225 are separated, the sealed capsule can remain held in first tray 220. Based on the sensor signals from the vacuum needles 240 indicating whether a vacuum needle 240 failed to pick up a plant seed, control circuitry can use those sensor signals to determine which sealed capsules, if any, do not include a plant seed. If one or more sealed capsules do not include a plant seed, then the identified sealed capsules can be modified by denting them with a denter. The denter can be configured to include a blunt tip that is moved into contact with the identified sealed capsules where the contact causes the capsule to include a dent or pushed in portion that makes the sealed capsule recognizable and distinguishable from the sealed capsules that include plant seeds and have not been modified.

The sealed capsules with plant seeds are separated from the sealed capsules lacking plant seeds. (step 560). For example, motor 230 can move first tray 220 holding the sealed capsules to an output section of device 200. The output section preferably includes a divider that enables sealed capsules with plant seeds to be separated from sealed capsules lacking plant seeds. Before releasing the sealed capsules to the output section, a sensor can be configured to detect which of the sealed capsules, if any, have been modified, such as by the denter, due to failure to include a plant seed. Such identified sealed capsules are then released into the output section in a manner by which the divider can separate the identified sealed capsules lacking plant seeds from the sealed capsules having plant seeds.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

The invention claimed is:

1. A device for inserting seeds in a capsule, comprising:
a seed bin for storing a plurality of plant seeds;
a materials bin for storing a growing medium;
a first tray configured to hold a plurality of capsule bodies;
a second tray configured to hold a plurality of capsule cap portions, each capsule cap portion configured to couple to a corresponding capsule body in response to a force being applied between a capsule cap portion and a corresponding capsule body;
a motor, coupled to the first tray and the second tray, configured to enable the first tray and the second tray to move to a plurality of positions within the device;
at least one vacuum needle configured to generate a vacuum suction at a tip of the at least one vacuum needle sufficient to extract a plant seed from the seed bin;
a robot arm, coupled to the at least one vacuum needle, and configured to move the at least one vacuum needle to a plurality of positions within the device; and
circuitry configured to:
control the motor to move the first tray to a first position to receive and hold the plurality of capsule bodies;
control the motor to move the second tray to a second position to receive and hold the plurality of capsule cap portions;
control the motor to move the first tray adjacent to the materials bin that enables each of the plurality of capsule bodies to receive and store growing medium extracted from the materials bin;
control the robot arm to move the at least one vacuum needle adjacent to the seed bin to pick up a seed from the seed bin; and
control the robot arm to move the at least one vacuum needle adjacent to the first tray; and
remove the vacuum suction from the at least one vacuum needle such that the seed picked up by the at least one vacuum needle is released into a capsule body in the first tray.

2. A device according to claim 1, wherein the circuitry is further configured to:
control the motor to move the first tray and the second tray to be aligned such that the second tray is positioned above the first tray after the seed has been released into a capsule body in the first tray; and
control an application of a force to join each capsule cap portion in the second tray to a corresponding capsule body in the second tray, thereby creating a sealed capsule enclosing growing medium and a seed in the first tray.

3. A device according to claim 2, further comprising a capsule collection hopper to receive each sealed capsule from the first tray, wherein the circuitry is further configured to control release of each sealed capsule from the first tray to the capsule collection hopper.

4. A device according to claim 3, further comprising:
a seed sensor to detect whether a seed has been picked up by the at least one vacuum needle, the seed sensor being configured to send a signal to the circuitry indicating whether a seed has been picked up by the at least one vacuum needle; and
a diverter configured to divert a sealed capsule from the first tray to a defective capsule collection hopper according to the signal from the seed sensor, wherein the circuitry is further configured to:
receive the signal from the seed sensor; and
control the diverter to divert a sealed capsule from the first tray to the defective capsule collection hopper in response to the signal from the seed sensor indicating that a seed has not been picked up by the at least one vacuum needle.

5. A device according to claim 4, further comprising:
a denter configured to dent a sealed capsule according to the signal from the seed sensor; and
a dent sensor configured to detect whether a sealed capsule has a dent and to send a dent signal to the circuitry indicating whether a sealed capsule has a dent;
wherein the circuitry is further configured to:
receive the dent signal from the dent sensor; and
control the diverter to divert a sealed capsule having a dent from the first tray to the defective capsule collection hopper in response to the signal from the dent sensor indicating that the sealed capsule has a dent.

6. A device according to claim 4, wherein the seed sensor is configured to:
detect a pressure differential in the at least one vacuum needle a predetermined time period after the robot arm moved the at least one vacuum needle adjacent to the seed bin to pick up a seed from the seed bin; and
generate the signal to the circuitry indicating whether a seed has been picked up by the at least one vacuum needle based on the detected pressure differential.

7. A device according to claim 4, where the seed sensor further comprises at least one of a proximity switch or a camera to detect whether the at least one vacuum needle has picked up a seed a predetermined time period after the robot arm moved the at least one vacuum needle adjacent to the seed bin to pick up a seed from the seed bin, wherein the seed sensor is further configured to generate the signal to the circuitry indicating whether a seed has been picked up by the at least one vacuum needle based on detection from the proximity switch or camera.

8. A device according to claim 1, wherein the circuitry is further configured to control an application of air pressure to the at least one vacuum needle after a seed has been released and before picking up another seed, the application of air pressure causing pressurized air to pass through the at least one vacuum needle.

9. A device according to claim 1, where the at least one vacuum needle includes a plurality of vacuum needles, wherein the circuitry is further configured to:
control each of the plurality of vacuum needles to pick up a respective seed from the seed bin; and
remove the vacuum suction from the each of the plurality of vacuum needles such that each seed picked up by plurality of vacuum needles is released into a respective capsule body in the first tray.

10. A device according to claim 1, wherein the growing medium includes at least one of a fertilizer, polyacrylamide, pulverized crystals of polyacrylamide, rice, ground rice, a hydrogel, a superabsorbent polymer, sodium bicarbonate, corn starch, or compost.

11. A method for inserting seeds in a capsule in a device having a seed bin for storing a plurality of plant seeds, a materials bin for storing a growing medium, a first tray configured to hold a plurality of capsule bodies, a second tray configured to hold a plurality of capsule cap portions, each capsule cap portion configured to couple to a corresponding capsule body in response to a force being applied between a capsule cap portion and a corresponding capsule body, a motor, coupled to the first tray and the second tray, configured to enable the first tray and the second tray to move to a plurality of positions within the device, at least one vacuum needle configured to generate a vacuum suction at a tip of the at least one vacuum needle sufficient to extract a plant seed from the seed bin, and a robot arm coupled to the at least one vacuum needle and configured to move the at least one vacuum needle to a plurality of positions within the device, the method comprising:

controlling the motor to move the first tray to a first position to receive and hold the plurality of capsule bodies;

controlling the motor to move the second tray to a second position to receive and hold the plurality of capsule cap portions;

controlling the motor to move the first tray adjacent to the materials bin that enables each of the plurality of capsule bodies to receive and store growing medium extracted from the materials bin;

controlling the robot arm to move the at least one vacuum needle adjacent to the seed bin to pick up a seed from the seed bin; and controlling the robot arm to move the at least one vacuum needle adjacent to the first tray; and removing the vacuum suction from the at least one vacuum needle such that the seed picked up by the at least one vacuum needle is released into a capsule body in the first tray.

12. A method according to claim 11, the method further comprising:

controlling the motor to move the first tray and the second tray to be aligned such that the second tray is positioned above the first tray after the seed has been released into a capsule body in the first tray; and controlling an application of a force to join each capsule cap portion in the second tray to a corresponding capsule body in the second tray, thereby creating a sealed capsule enclosing growing medium and a seed in the first tray.

13. A method according to claim 12, wherein the device further includes a capsule collection hopper to receive each sealed capsule from the first tray, the method further comprising controlling release of each sealed capsule from the first tray to the capsule collection hopper.

14. A method according to claim 13, the method further comprising:

detecting whether a seed has been picked up by the at least one vacuum needle;

sending a signal indicating whether a seed has been picked up by the at least one vacuum needle; and diverting a sealed capsule from the first tray to a defective capsule collection hopper according to the signal.

15. A method according to claim 14, the method further comprising:

denting a sealed capsule according to the signal;

detecting whether a sealed capsule has a dent;

sending a signal whether a sealed capsule has a dent; and diverting a sealed capsule having a dent from the first tray to the defective capsule collection hopper in response to the signal indicating that the sealed capsule has a dent.

16. A method according to claim 14, the method further comprising:

detecting a pressure differential in the at least one vacuum needle a predetermined time period after the robot arm moved the at least one vacuum needle adjacent to the seed bin to pick up a seed from the seed bin; and generating the signal indicating whether a seed has been picked up by the at least one vacuum needle based on the detected pressure differential.

17. A method according to claim 14, the method further comprising:

detecting whether the at least one vacuum needle has picked up a seed a predetermined time period after the robot arm moved the at least one vacuum needle adjacent to the seed bin to pick up a seed from the seed bin using at least one of a proximity switch or a camera; and generating the signal indicating whether a seed has been picked up by the at least one vacuum needle based on the detection.

18. A method according to claim 11, the method further comprising controlling an application of air pressure to the at least one vacuum needle after a seed has been released and before picking up another seed, the application of air pressure causing pressurized air to pass through the at least one vacuum needle.

19. A method according to claim 11, where the at least one vacuum needle includes a plurality of vacuum needles, the method further comprising:

controlling each of the plurality of vacuum needles to pick up a respective seed from the seed bin; and removing the vacuum suction from the each of the plurality of vacuum needles such that each seed picked up by plurality of vacuum needles is released into a respective capsule body in the first tray.

20. A method according to claim 11, wherein the growing material includes at least one of a fertilizer, polyacrylamide, pulverized crystals of polyacrylamide, rice, ground rice, a hydrogel, a superabsorbent polymer, sodium bicarbonate, corn starch, or compost.

* * * * *